United States Patent [19]

Watrous

[11] 4,450,493
[45] May 22, 1984

[54] MAGNETIC HEAD SLIDER AND ACTUATOR ASSEMBLY

[75] Inventor: Robert B. Watrous, San Jose, Calif.

[73] Assignee: International Business Machines Corporation, Armonk, N.Y.

[21] Appl. No.: 320,167

[22] Filed: Nov. 10, 1981

[51] Int. Cl.³ .......................... G11B 5/55; G11B 5/60; G11B 21/10; G11B 5/10
[52] U.S. Cl. ...................................... 360/106; 310/13; 360/103; 360/104
[58] Field of Search ................ 360/106, 102, 103, 104; 310/13, 27

[56] References Cited

U.S. PATENT DOCUMENTS 4,396,966  8/1983  Scranton et al. ..................... 360/106

OTHER PUBLICATIONS

IBM Technical Disclosure Bulletin, vol. 2, No. 3, Oct. 1959, p. 39, Transducer Mounting, Haughton et al.

Primary Examiner—George G. Stellar
Attorney, Agent, or Firm—N. N. Kallman; R. E. Cummins

[57] ABSTRACT

A magnetic head slider and actuator assembly has an air bearing magnetic head slider that is coupled to an electrical coil. Permanent magnets are positioned in a stationary frame to provide a magnetic field adjacent to the coil. When current is supplied to the coil, it moves within a slot in the frame between the permanent magnets and transports the head slider accordingly. In this way, the magnetic head slider is actuated to access data tracks on a magnetic disk.

6 Claims, 7 Drawing Figures

MAGNETIC HEAD SLIDER AND ACTUATOR ASSEMBLY

DESCRIPTION

1. Technical Field

This invention relates to a magnetic head slider and actuator assembly used in accessing type disk files.

An object of this invention is to provide a magnetic head slider and actuator assembly having less parts than conventional assemblies employed in disk files.

Another object of this invention is to provide a magnetic head slider and actuator assembly with improved accessing speed capabilities.

Another object is to provide a magnetic head slider and actuator assembly that is easy to manufacture, and at less cost than previously known head and actuator assemblies.

2. Background Art

In prior art disk files, the head accessing system includes magnetic transducers, air bearing head sliders to which the transducers are attached, head suspensions on which the sliders are mounted, head arms to which the suspensions are joined, and an actuator, such as a voice coil motor, coupled to the entire assembly. It is apparent that a system of this type has many components, requires many manufacturing steps and processes, and is costly to manufacture and maintain. Also, the magnitude of the moving mass used for accessing to data tracks on a disk surface limits the accessing speed. Other problems, such as misalignment, skewing, dynamic resonances, inter alia, are experienced with such accessing systems.

CROSS-REFERENCE TO COPENDING APPLICATION

A magnetic head slider and actuator assembly that operates without the conventional accessing arm is disclosed in copending patent application serial No. 320,166. The present invention differs in that the spring suspensions, employed in prior art head/arm assemblies and in the novel structure of the aforementioned copending application, are eliminated from the assembly disclosed herein.

BRIEF DESCRIPTION OF THE DRAWINGS

The invention will be described in detail with reference to the drawing in which.

DISCLOSURE OF THE INVENTION

Figure 1:
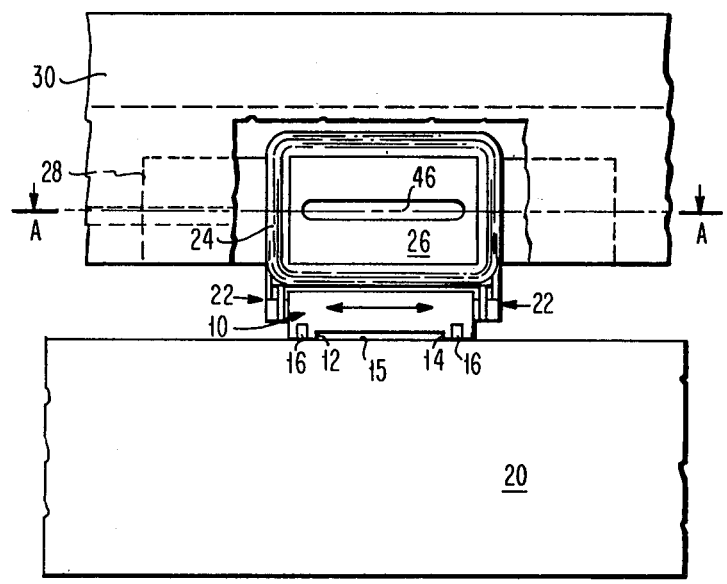
FIG. 1 is a rear view, partly broken away, of a magnetic head slider and actuator assembly, made in accordance with this invention.
Figure 2:
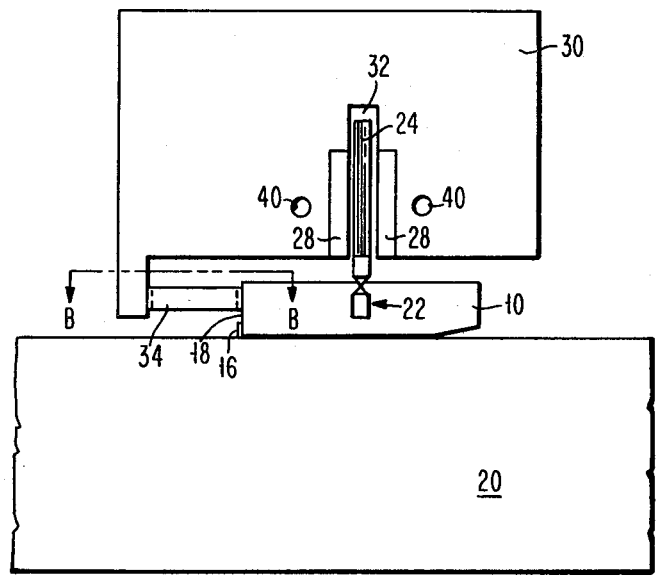
FIG. 2 is a side view of the assembly of FIG. 1.

With reference to FIGS. 1 and 2, which depict a preferred implementation of this invention, a magnetic head slider and actuator assembly comprises a head slider 10 having rails 12 and 14 and recess 15 at an air bearing surface. This air bearing is of the type covered by U.S. Pat. No. 3,855,625 which describes an air bearing slider that flies at a controlled low head/disk spacing without any external force being applied. Magnetic transducers 16 are mounted to the trailing end 18 of the slider 10 for transducing interaction with a magnetic disk 20.

A rectangular rigid wire coil 24 is supported on a core 26, made of ceramic by way of example, that is thicker than the coil.

Figure 6:
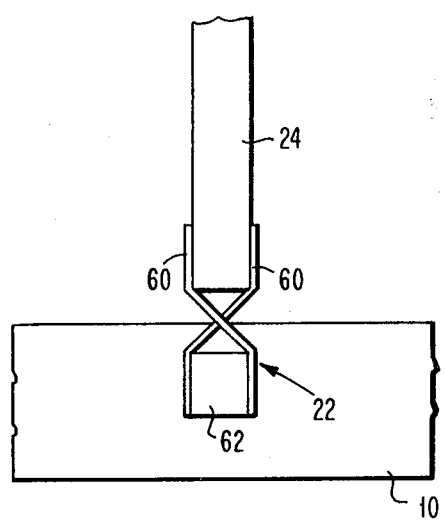
FIG. 6 is a side view of the arrangement of FIG. 5.
Figure 5:
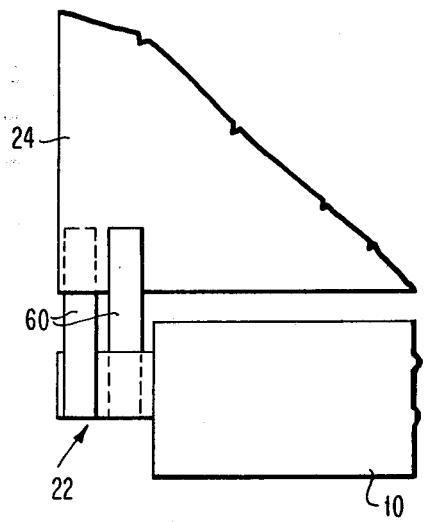
FIG. 5 is an enlarged breakaway rear view of the head slider and the electrical coil.

The wire coil 24 is encompassed by epoxy for example, and is joined to the slider by a connecting cross spring pivot 22, illustrated in detail in FIGS. 5 and 6. The cross spring pivot acts as a friction-free hinge that allows the coil to move free of the slider. Also, the slider moves free of the coil, so that the slider may follow the topography of the disk surface without restriction from the coil.

The coil 24 is oriented so that its rectangular plane extends perpendicularly from the slider surface and is aligned radially in the direction of accessing, as indicated by the bidirectional arrow. The wire coil 24 is connected to a current source (not shown) that provides bidirectional current of different magnitudes so that the coil and the slider may be actuated to move in a defined direction for a given distance to a selected data track on the disk surface.

Figure 3:
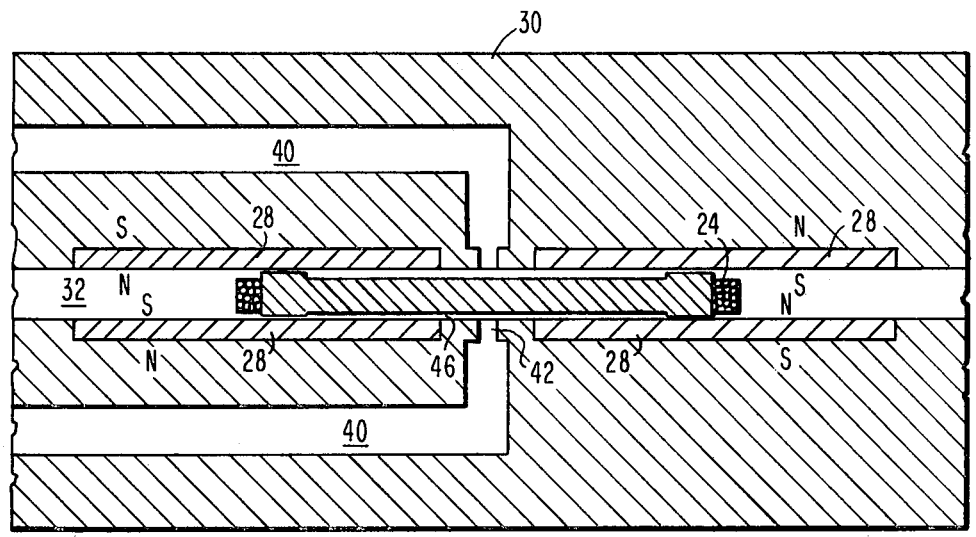
FIG. 3 is a section A—A taken through FIG. 1.

To achieve the actuation, magnetic flux is provided by sets of permanent magnets 28 (FIG. 3) that are positioned in a stationary frame 30 fixed to a housing. One set of permanent magnets 28 is disposed to encompass one end of the coil. The other set of permanent magnets, which is reversed in polarity relative to the first set of permanent magnets, encompasses the other end of the coil. The polarity reversal is required because the current at the opposing coil ends flow in opposite directions. Together with the permanent magnets, a linear actuator is formed for driving the slider, which is joined to the coil, bidirectionally in a radial accessing path across the surface of the disk. The rectangular planar type coil fits into a slot 32 within the rigid frame so that the coil is freely movable. The coil is limited in its travel to one half of the coil length, so as to maintain interaction with the correct polarities of the magnets. Stops may be provided to prevent escape of the coil from the slot.

Air passages 40 are provided within the frame to allow air, under pressure, to reach control orifices 42 on the walls of the slot 32. The air bearing pressure is obtained from a blower (not shown) attached to the housing in which the frame is positioned. The core has grooves 46 in each face aligned with the control orifices 42. The grooves 46 distribute the air from the control orifices uniformly over the bearing faces of the coil core independent of the radial position of the slider and coil assembly. The air sustains an air bearing between the walls of the slot and the flat surfaces of the coil core 26.

Figure 4:
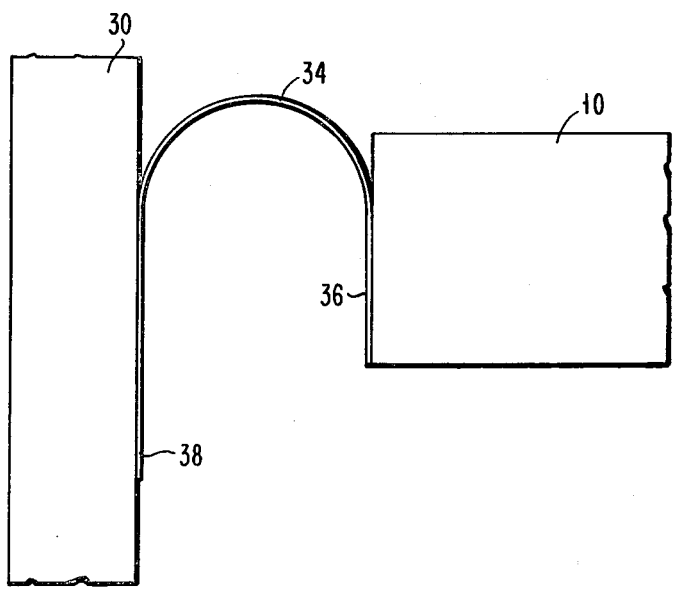
FIG. 4 is a section B—B taken through FIG. 2.

With reference to FIG. 4, which is a sectional view B—B of FIG. 2, a flexible lead wire cable 34 is fastened at one end 36 to the slider 10 and at its other end 38 to the stationary frame. The lead wires connect to the actuator coil 24 and to the coils of the magnetic heads or transducers 16 disposed on the air bearing slider 10. The flexibility of the wire cable allows the unfastened portion to roll along the surfaces of the frame and slider, as the slider is moved with the coil actuator.

FIGS. 5 and 6 illustrate the detail of the cross spring pivot connection 22 between the slider 10 and actuator coil structure 24. The pivot connection 22 is formed with two cross spring strips 60 that are attached to an extension 62 of the slider. When the coil 24 moves to access and then follow the disk tracks, the spring strips 60 serve as a mechanical hinge so that the slider motion across the disk precisely follows the coil movement, but is not unduly affected by the disk flutter or uneven topography of the disk.

Figure 7:
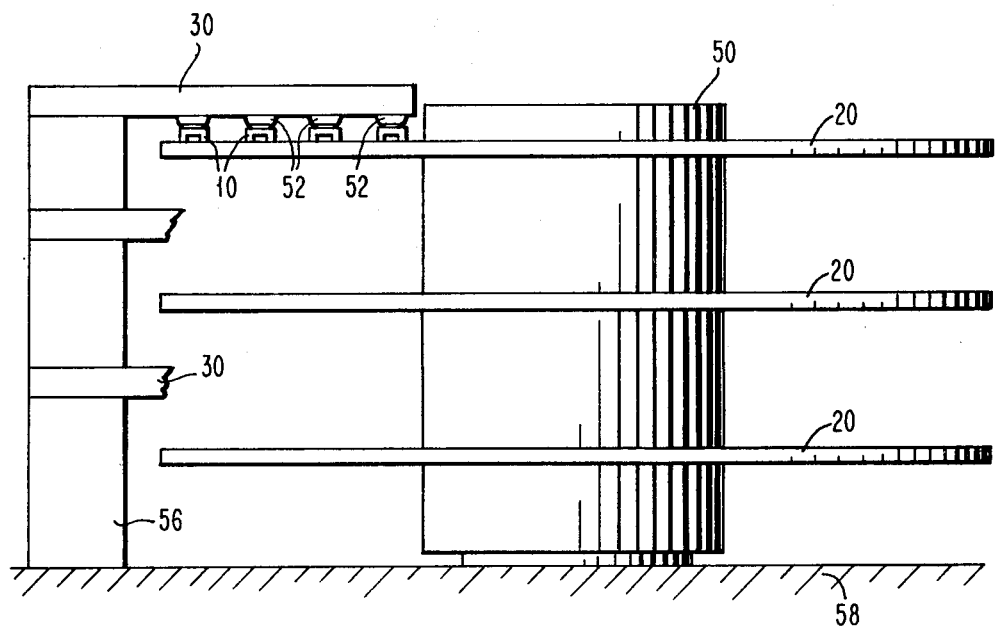
FIG. 7 is a representational illustration of a disk drive assembly employing the invention.

FIG. 7 represents a disk drive assembly that employs the slider and actuator assembly of this invention. A plurality of magnetic disks 20 are mounted to a spindle hub 50 for rotation relative to accessing sliders 10 coupled to respective coil actuators 52 which are disposed within slots of a fixed frame 30. The frame is attached to a pedestal 56 that is securely seated on a baseplate 58. The slider and actuator assemblies are movable bidirectionally relative to the disk surfaces for recording and accessing data on different data tracks. The actuators and sliders may be energized separately or as a group depending on the electrical connections to drive current sources. Only one group of slider and actuator assemblies and associated frame are shown for the purpose of convenience, but it should be understood that additional assemblies and frames may be employed with this disk drive configuration.

What is claimed is:

1. A magnetic head and actuator assembly for use in transferring information to and from the magnetic surface of a rotating disk of a disk file comprising in combination:

an air bearing slider on which said magnetic head is disposed including an air bearing surface for maintaining said magnetic head in a data transferring relationship to said magnetic surface as said slider is moved by said actuator relative to said disk to position said head at selected concentric recording tracks on said magnetic surface;

said actuator including a stator and a flat planar armature comprising a planar rectangular bearing element and an energizable flat coil wound on the edge perimeter of said planar bearing element, said rectangular bearing element including a pair of separate continuous air bearing surfaces each disposed adjacent said perimeter to define a shallow air plenum on each of the opposite surfaces of said bearing element, said stator including a channel having a pair of opposed parallel air bearing surfaces which cooperate with said bearing surfaces of said armature to guide the movement of said head along a radial linear path to thereby eliminate any undesirable yaw or tangential motion while allowing movement of said armature within said channel in a role motion around an axis parallel to said disk and said radial direction and in a direction normal to said disk surface to permit said head to follow any flutter of said disk surface;

means associated with said stator for establishing a flux field extending normal to and between said parallel air bearing surfaces;

means for supplying air to said plenum to maintain said stator and said armature in an air bearing relationship;

means for supplying current to said coil to cause movement of said armature relative to said flux field; and means for attaching said slider to said armature to allow said slider to pivot about an axis parallel to said direction of movement in order to follow the surface of said disk while restraining movement of said slider relative to said armature in all other directions.

2. The invention set forth in claim 1 in which said means for attaching said slider to said armature comprises a pair of cross-spring connectors, each of which comprises a first and second spring strip which are attached between said armature and said slider with said strips being offset relative to each other along said direction of movement to permit only relative pitch motion between said armature and said slider.

3. The invention set forth in claim 2 in which said means for supplying air to said plenum comprises a pair of air supply passages formed in said stator, one end of each said passage being adapted to be connected to a source of air under pressure and the other end of each said passage being disposed to supply air to a different one of said plenums.

4. The invention set forth in claim 3 in which said other end of said passage is positioned in said channel at substantially the center of said plenum when said armature is at a home position.

5. The invention set forth in claim 4 in which said means for establishing a flux field comprises first and second pairs of flat permanent magnets, each pair of said magnets being mounted in said stator with their flat surfaces forming a portion of said air being surface of said channel and being polarized in a direction normal to said flat surfaces to establish said flux field.

6. The invention set forth in claim 5 in which said disk is in a horizontal plane and said air bearing slider on which said magnetic head is disposed is of the self-loading type.

* * * * *